United States Patent [19]

Hwang et al.

[11] Patent Number: 5,764,944
[45] Date of Patent: Jun. 9, 1998

[54] METHOD AND APPARATUS FOR TLB INVALIDATION MECHANISM FOR PROTECTIVE PAGE FAULT

[75] Inventors: Jeng-Yan Hwang; Shi-Chang Wang; Yuan-Ting Wu, all of Hsin-Chu, Taiwan

[73] Assignee: United Microelectronics Corp., Hsin-Chu, Taiwan

[21] Appl. No.: 525,021

[22] Filed: Sep. 8, 1995

[51] Int. Cl.⁶ ............................ G06F 12/00; G06F 12/10
[52] U.S. Cl. ..................... 395/417; 395/412; 395/416; 395/418; 395/415
[58] Field of Search .................................. 395/415, 416, 395/417, 412, 418, 419

[56] References Cited

U.S. PATENT DOCUMENTS

| | | | |
|---|---|---|---|
| 4,456,954 | 6/1984 | Bullions et al. | 395/417 |
| 4,680,700 | 7/1987 | Hester et al. | 395/416 |
| 4,849,881 | 7/1989 | Eguchi | 395/415 |
| 5,301,287 | 4/1994 | Herrel | 395/412 |
| 5,491,806 | 2/1996 | Horstmann et al. | 395/417 |
| 5,546,555 | 8/1996 | Horstmann | 395/417 |

*Primary Examiner*—David K. Moore
*Assistant Examiner*—Than V. Nguyen
*Attorney, Agent, or Firm*—Bacon & Thomas

[57] ABSTRACT

A method and apparatus for modifying protective page fault, which executes TLB table walk when protective page fault occurs in order to modify protective page fault. The method includes the following steps: (1) detecting the occurrence of protective page fault; (2) executing protective page fault processing mechanism; (3) executing protective page fault service routine; (4) returning to the address where protective page fault occurs; (5) executing TLB table walk to complete modification for protective page fault; and invalidating the TLB entry for protective fault page at step (2).

5 Claims, 4 Drawing Sheets

METHOD AND APPARATUS FOR TLB INVALIDATION MECHANISM FOR PROTECTIVE PAGE FAULT

BACKGROUND OF THE INVENTION

1. Field of the Invention

The present invention relates generally to a method and apparatus for TLB (Translation Lookaside Buffer) invalidation mechanism for protective page fault in a X86 system. The invention particularly relates to a method and apparatus which applies a modification mechanism to invalidate the TLB entry of a protective fault page with only one-time TLB table walk.

2. Description of the Prior Art

A TLB (Translation Lookaside Buffer) is an on-chip cache that references the most recently used page table entries and translates linear addresses into physical addresses directly without having to access page tables and page directories from the main memory. The TLB is usually organized as an eight-set by four-way association of linear-address tags and physical-address datum, with related LRU and protection bits. When paging is enabled in the Protected mode, a processor's TLB references the most recently used page table entries. Then, the TLB translates linear addresses into physical addresses without having to access page tables and page directories from the main memory.

Page fault refers to a situation that the processor can retry (re-start). Page faults often occur during normal operation, such as when a new page must be loaded from disk into memory. When a service routine handles a fault, its return address points to the instruction that caused the fault so that the instruction can be retried. In a X86 computer architecture, when protective page fault occurs, the system has to apply protective page fault service routine to flush all the TLB entry, that is, invalidate all the TLB valid entries to ensure the correspondence between the entries of the page table and that of the TLB after modification. This approach reduces overall performance of the system significantly.

There is another approach which does not rely on protective page fault service routine to flush the TLB, but has to execute TLB table walk twice. This also reduces overall performance of the system.

Advanced operating systems which employs copy-on-write operating systems, such as Linux, usually will not make a copy for shared data. Instead, it sets the shared data of a page table as read-only mode. When a page with shared data has to be updated and is executing write instruction, page fault occurs. At this time, the operating system applies page fault service routine to make a copy of the page and then change the mode of both pages (the original page and the copy) to read/write mode. For such advanced operating systems, the two approaches for protective page fault stated above will reduce the performance of the system more apparently.

SUMMARY OF THE INVENTION

Accordingly, it is the primary object of the present invention to provide an improved method and apparatus for TLB invalidation mechanism for protective page fault to improve system performance.

Briefly described, the present invention encompasses a method for TLB invalidation mechanism for protective page fault. The steps of the inventive method include: (1) detecting the occurrence of protective page fault; (2) executing protective page fault processing mechanism; (3) invalidating the TLB entry for protective fault page; (4) executing protective page fault service routine; herein the TLB entry for the protective fault page has been invalidated; (5) returning to the address where protective page fault occurs; (6) executing TLB table walk to complete the modification for protective page fault; and step (6) executes TLB table walk only once.

The present invention which outputs an invalidate signal to invalidate the TLB entry for protective fault page further encompasses: invalidate address generator for generating an invalidate address input to TLB; TLB invalidation control device for inputting a signal which indicates protective page fault and a signal which indicates invalidate request and for outputting an invalidate control signal to TLB; and invalidating the TLB entry for protective fault page in response to the invalidate address and the invalidate control signal.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

Figure 1:
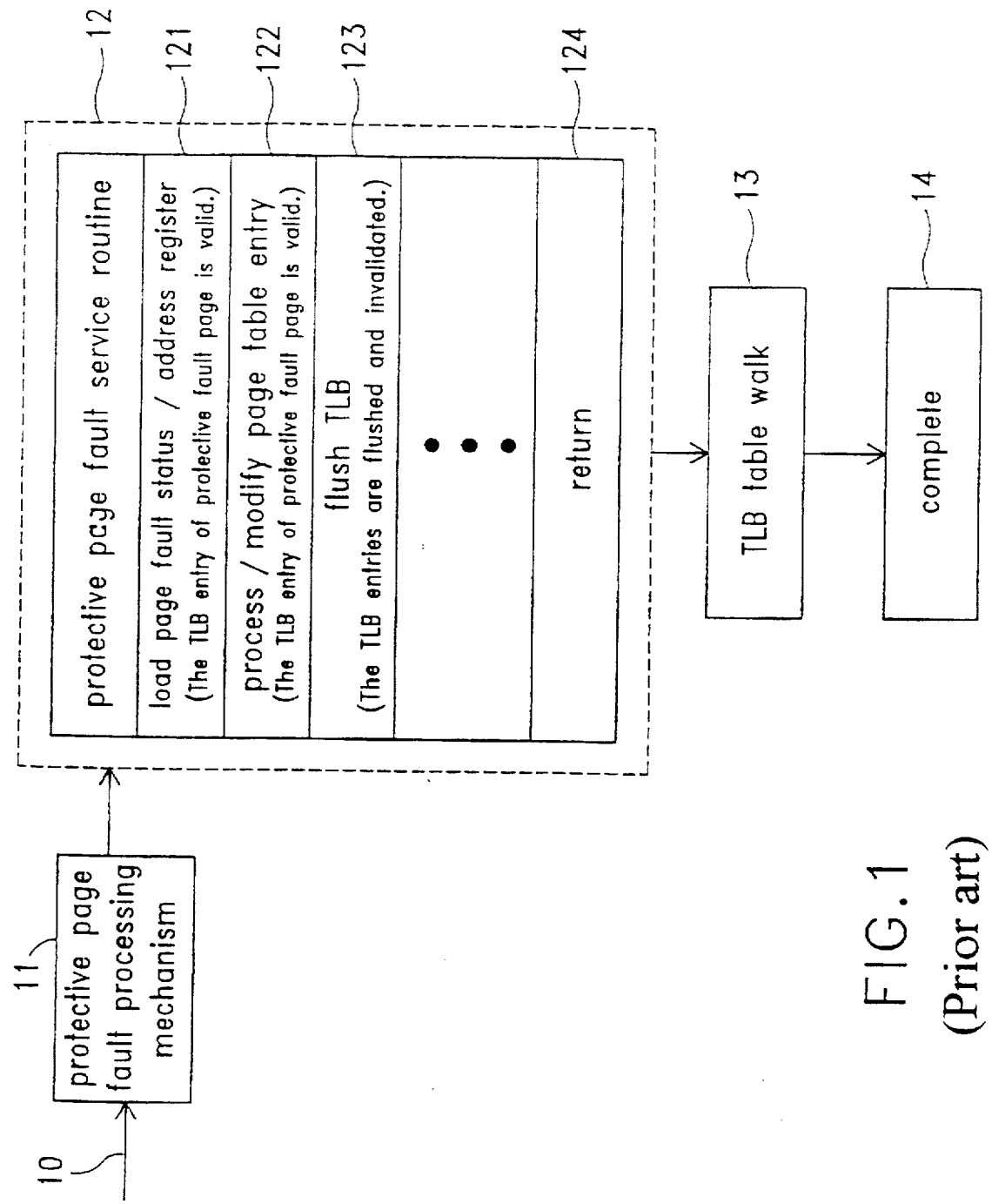
FIG. 1 is a schematic diagram showing the mechanism for protective page fault according to the prior art.

FIG. 1 shows a modification mechanism for protective page fault according to the prior art. The detailed description for the execution steps are stated below:

10: protective page fault occurs;

11: protective page fault processing mechanism detects protective page fault and enables protective page fault service routine 12;

12: execute protective page fault service routine;

121: load page fault status/address register;

122: process/modify page table entities to ensure the entries of the page table be correct;

Please note that at step 121 and step 122, the TLB entry of protective fault page is valid.

123: TLB entry are flushed and invalidated;

124: return to the address where page fault occurs;

13: execute TLB table walk;

At this time, since all the TLB, entry are invalidated, so when the system is executing TLB table walk 13, it will write the page table entry for protective page fault, processed/modified at step 122 into the TLB.

14: complete protective page fault modification.

The protective page fault processing mechanism 11 of FIG. 1 does not flush TLB entries. Instead, it relies on step 123 of protective page fault service routine 12 to flush TLB. This approach will invalidate all the TLB entries even though most TLB entries are correct and not have to execute TLB table walk. Therefore, it will reduce system performance significantly.

Figure 2:
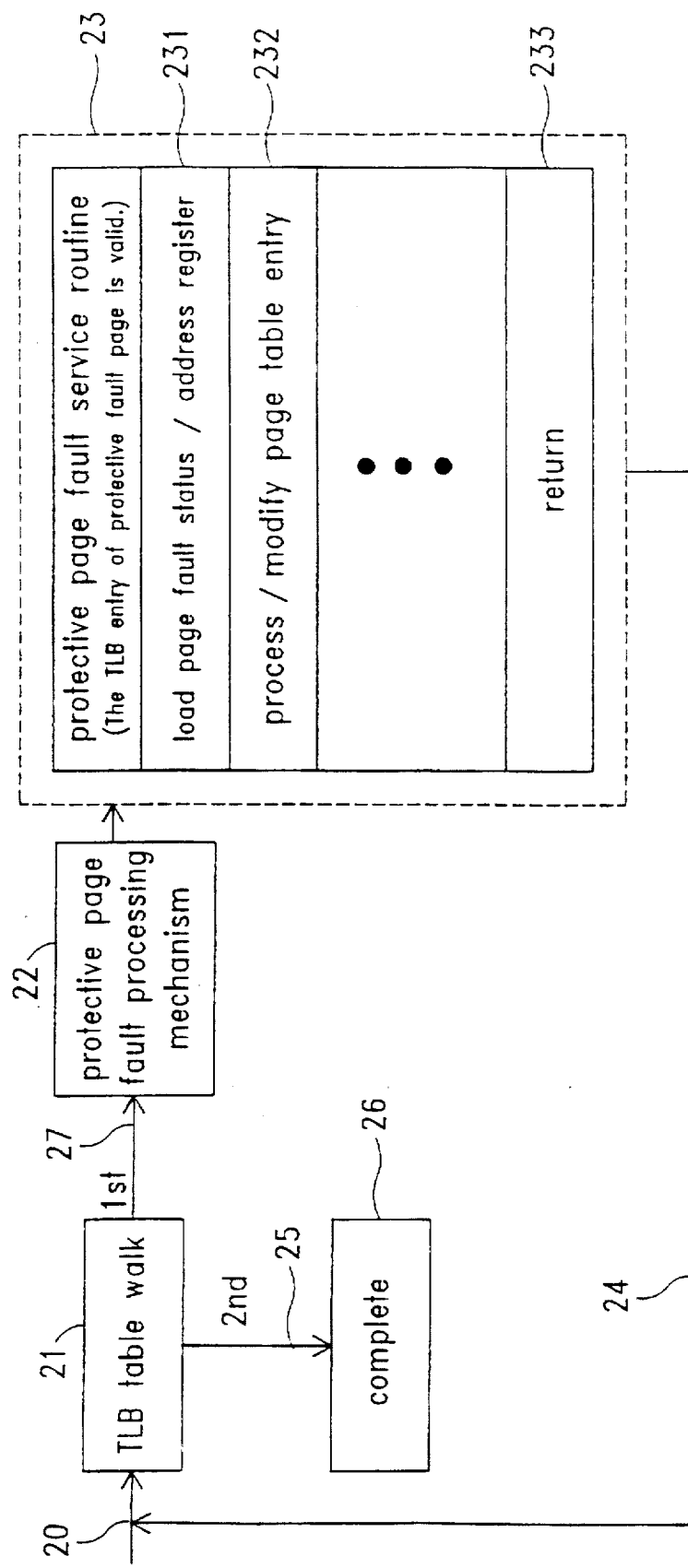
FIG. 2 is a schematic diagram showing the mechanism for protective page fault according to another prior art.

FIG. 2 shows another approach according to the prior art. The detailed description for the execution steps are described below:

20: protective page fault occurs;

21: execute TLB table walk 21 which writes the entry of a page table into TLB.

However, since the entry of the page table have not been modified yet, so the data just written in the TLB is still incorrect;

22: execute protective page fault processing mechanism;

23: execute protective page fault service routine;

231: load page fault status/address register;

232: process/modify page table entities to ensure the entries of the page table be correct;

233: return;

24: return to the address where page fault occurs;

However, at this time, page fault in the TLB still exists and fault page is still valid. Thus, protective page fault occurs again. Step 21 executes TLB table walk once more which writes page table entities modified at step 232 into the TLB. Now protective page fault processing mechanism at step 22 detects no page fault, so it does not go to step 27. Instead, it goes to step 25.

26: complete the modification of protective page fault.

Figure 3:
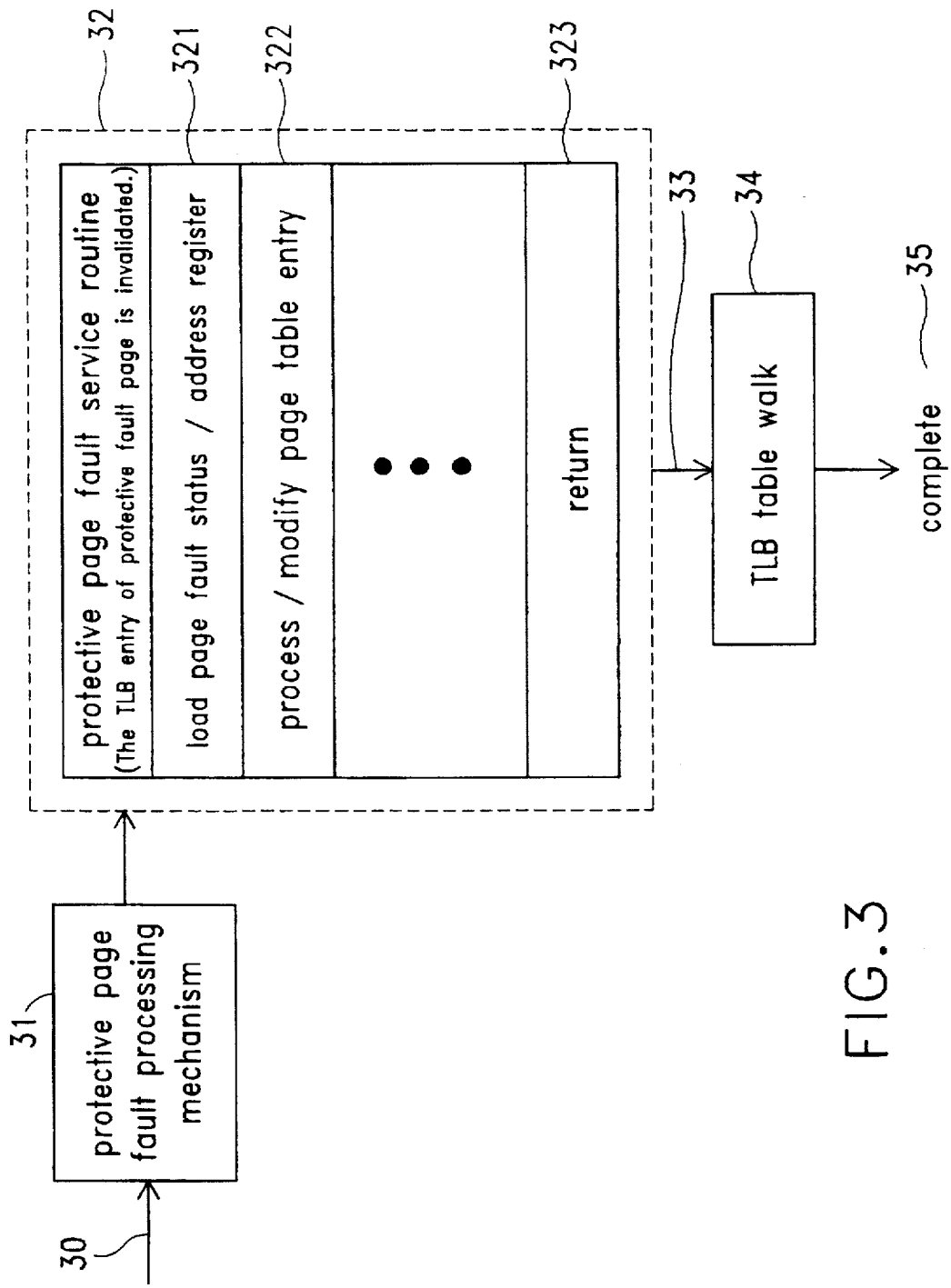
FIG. 3 is a schematic diagram showing the TLB invalidation mechanism for protective page fault according to the present invention.

FIG. 3 is a schematic diagram showing the TLB invalidation mechanism for protective page fault according to the present invention. The detailed description for the execution steps are described as follows:

30: protective page fault occurs;

31: execute protective page fault processing mechanism; protective page fault processing mechanism 31 has two functions: one is detecting the occurrence of protective page fault; the other is invalidating the TLB entry of protective fault page which is different from prior arts.

32: execute protective page fault service routine;

321: load page fault status/address register;

322: process/modify page table entities, that is, modify page table entries for fault page;

323: return;

33: return to the address where page fault occurred;

34: execute TLB table walk;

At this time, since the TLB entry for protective fault page has been invalidated before the execution of protective page fault service routine 32 and the steps that follows, including step 321, 322, and 323, therefore TLB table walk 34 is executed. The entry of page table which has been modified at step 322 is written to TLB, and validate the TLB entry of protective fault page.

35: complete the modification of protective page fault.

The main difference between FIG. 1 and FIG. 3 is that FIG. 3 does not need to flush TLB at step 123 which may invalidate TLB entry of protective fault page and then cause the occurrence of protective fault page. Furthermore, flushing TLB at step 123 also stops other correct and valid pages from being continuously used. They have to stay idle until next time when TLB table walk is executed. As mentioned above, this approach is very inefficient and will reduce system performance very significantly. In contrast, according to FIG. 3, the invention only invalidates TLB entry of protective fault page, not all the entries.

The main difference between FIG. 2 and FIG. 3 is that whenever protective page fault occurs, FIG. 2 has to execute TLB table walk twice to modify protective page fault. In contrast, the invention only needs to execute TLB table walk once to complete the modification of protective page fault.

Figure 4:
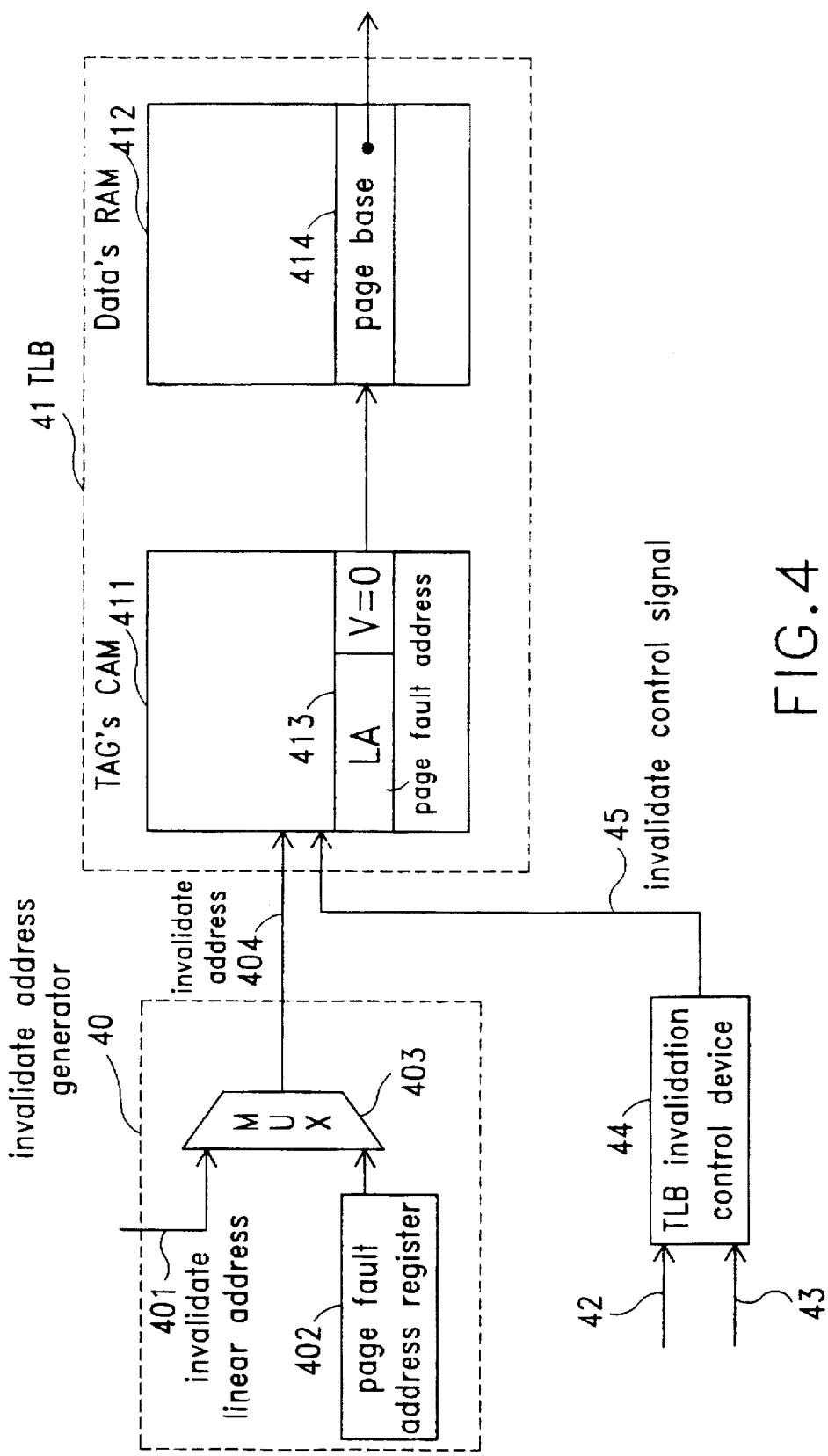
FIG. 4 is a block diagram showing the function blocks of the preferred embodiments according to the present invention.

FIG. 4 shows the function blocks according to the present invention. Invalidate address generator 40 consists of invalidate linear address 401, page fault address register 402 and MUX 403. TLB 41 consists of TAG's CAM (Content Addressable Memory) 411 and DATA's RAM 412. In addition, there is a TLB invalidation control device 44. All these devices constitute the TLB invalidation mechanism for protective page fault according to the invention.

Please refer to FIG. 4. Invalidate linear address 401 is a system invalidation request sent from the system. Page fault address register 402 stores page fault address. The inputs of MUX 403 are invalidate linear address 401 and page fault address from page fault address register 402. The output of MUX 403 is invalidate address 404 which is delivered to TAG's CAM 411 of TLB 41. TLB invalidation control device 44 receives two signal inputs: one indicating protective page fault 42 and the other indicating invalidate request 43. TLB invalidation control device 44 outputs an invalidate control signal 45 to TAG's CAM 411 of TLB 41. Since invalidate address 404 and invalidate control signal 45 are sent to TAG's CAM 411 to set V=0, therefore the valid entries indicated by the page fault address 413 are invalidated. DATA's RAM 412 then writes correct page table into page base 414 during TLB table walk according to page base 414 indicated by page fault address 413. DATA's RAM 412 sets V=1 to validate the valid entries of page fault address 413. Thus, the invalidation mechanism for protective page fault is finished.

The primary advantage of the invention is that it contains the TLB invalidation mechanism for protective page fault in the protective page fault processing mechanism. Thus, as soon as protective page fault process is finished, modified page table entries can be correctly loaded into the TLB automatically during TLB table walk without having to use software routines to flush TLB.

Another advantage of the invention is that it is flexible and can improve system performance. The invention can be implemented in hardware or micro code according to the structure of FIG. 4.

It should be understood that various alternatives to the structures described herein may be employed in practicing the present invention. It is intended that the following claims define the invention and that the structure within the scope of these claims and their equivalents be covered thereby.

What is claimed is:

1. A method for modifying protective page fault which executes TLB table walk when protective page fault occurs in order to modify protective page fault, said method comprising the steps of:

(1) detecting the occurrence of protective page fault;

(2) executing protective page fault processing mechanism for invalidating TLB entries where said occurrence of said protective page fault is detected;

(3) executing protective page fault service routine for processing/modifying page table entries to ensure said page table entries being correct;

(4) returning to the address where said protective page fault occurs; and (5) executing TLB table walk to complete modification for said protective page fault, and invalidating said TLB entry entries for protective page fault page at step (2), said TLB table walk executing only once every time when said protective page fault occurs.

2. A method according to claim 1, wherein step (2) comprises the step of:

invalidating a TLB correspondent address tag for said protective fault page of said TLB entries.

3. A method according to claim 1, wherein step (3) comprises the step of:

loading a page fault status/address.

4. A method according to claim 3, wherein step (3) comprises the step of:

omitting a step of flushing said TLB.

5. A method for modifying a protective page fault which executes said TLB table walk when said protective page fault occurs in order to modify said protective page fault, said method comprising the following steps:

(1) detecting the occurrence of the protective page fault;

(2) executing a protective page fault processing mechanism;

(3) invalidating a TLB correspondent address tag of the protective fault page.

* * * * *

UNITED STATES PATENT AND TRADEMARK OFFICE
CERTIFICATE OF CORRECTION

| | | |
|---|---|---|
| PATENT NO. | : 5,764,944 | Page 1 of 1 |
| APPLICATION NO. | : 08/525021 | |
| DATED | : June 9, 1998 | |
| INVENTOR(S) | : Jeng-Yan Hwang et al. | |

It is certified that error appears in the above-identified patent and that said Letters Patent is hereby corrected as shown below:

In the specification, at column 2, line 55, column 3, line 24, column 3, line 32, and column 3, line 51, replace the word "entities" with --entries--.

In the specification, at column 2, line 60, and column 2, line 64, replace the word "entry" with --entries--.

In claim 1, at column 4, lines 64-67, replace "A method for modifying protective page fault which executes TLB table walk when protective page fault occurs in order to modify protective page fault" with --A method for modifying a protective page fault which executes TLB table walk when said protective page fault occurs in order to modify said protective page fault--.

In claim 1, at column 5, line 1, replace "(1) detecting the occurrence of protective page fault;" with --(1) detecting an occurrence of said protective page fault;--.

In claim 1, at column 5, line 2, replace "executing protective page" with --executing a protective page--.

In claim 1, at column 5, line 5, replace "executing protective page" with --executing a protective page--.

In claim 1, at column 5, lines 12-16, replace "(5) executing TLB table walk to complete modification for said protective page fault, and invalidating said TLB entry entries for protective page fault page at step (2). said TLB table walk executing only once every time when said protective page fault occurs." with --(5) executing said TLB table walk to complete modification of said protective page fault, and invalidation of said TLB entries for said protective page fault at step (2), said TLB table walk executing only once every time when said protective page fault occurs.--.

In claim 5, at column 6, line 10, replace "said TLB table walk" with --TLB table walk--.

In claim 5, at column 6, line 18, replace "." with --;--.

At the end of claim 5 at column 6, add --(4) executing a protective page fault service routine to invalidate said TLB correspondent address tag for a protective fault page; (5) returning to the address where said protective page fault occurs; and (6) executing said TLB table walk only once to complete the modification for said protective page fault.--.

Signed and Sealed this
Twenty-second Day of March, 2011

David J. Kappos
*Director of the United States Patent and Trademark Office*